March 6, 1962 W. J. HALL 3,023,669
SLIDE PROJECTOR

Filed March 2, 1959 13 Sheets-Sheet 1

Inventor
Walter J. Hall
By Robert F. Miehle, Jr.
Atty.

March 6, 1962 W. J. HALL 3,023,669
SLIDE PROJECTOR
Filed March 2, 1959 13 Sheets-Sheet 2
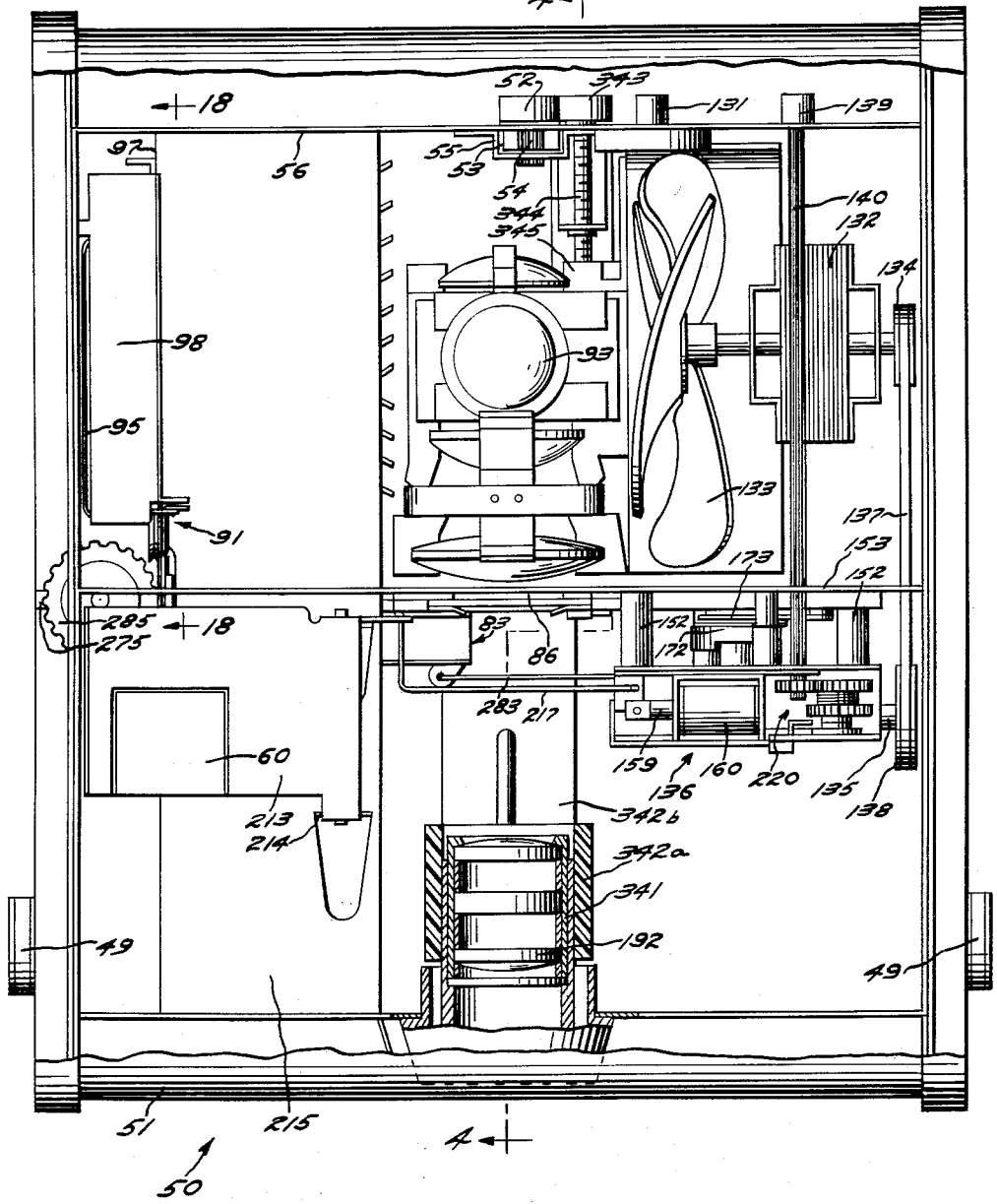
Inventor
Walter J. Hall
By Robert F. Michler
Atty.

March 6, 1962 W. J. HALL 3,023,669
SLIDE PROJECTOR
Filed March 2, 1959 13 Sheets-Sheet 3
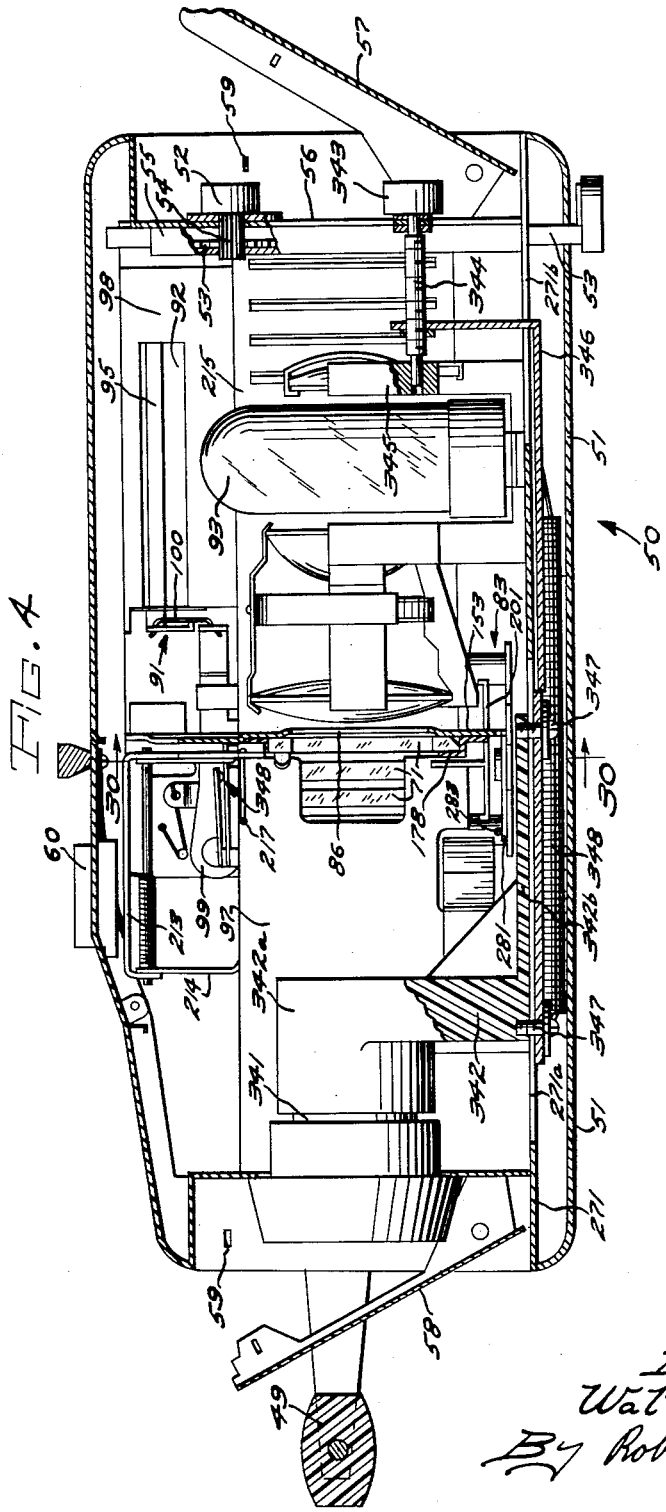
Inventor
Walter J. Hall
By Robert F. Miehle, Jr.
Atty.

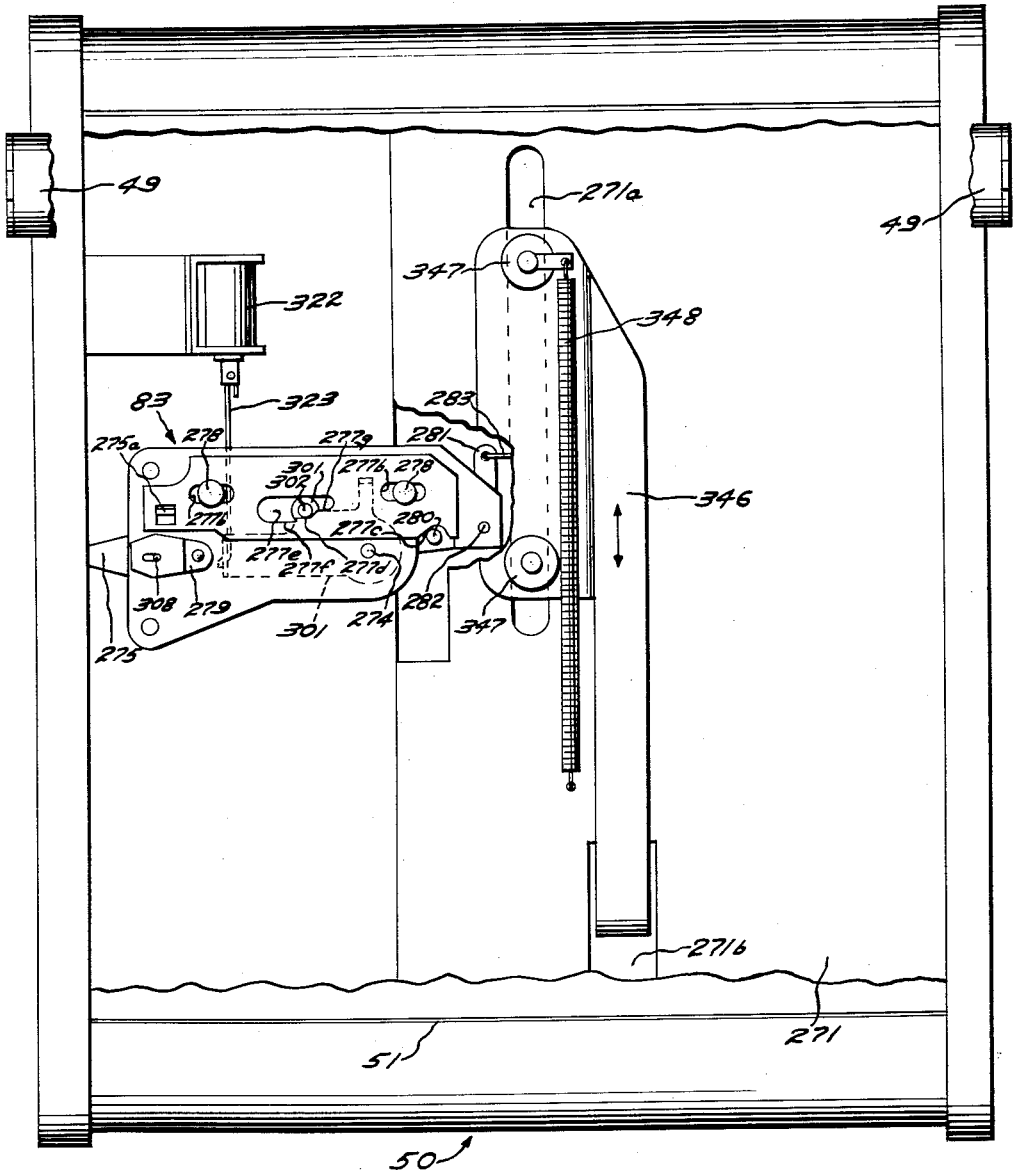

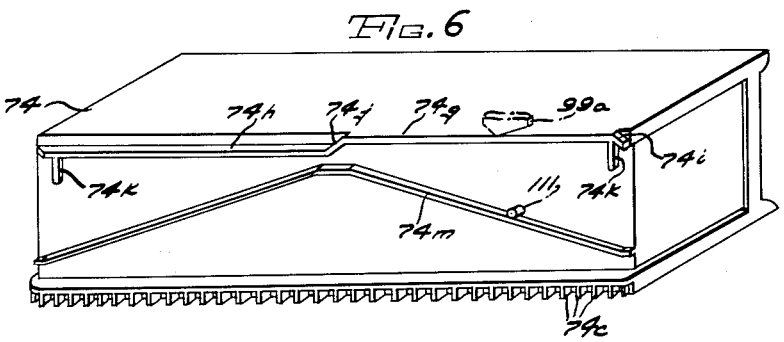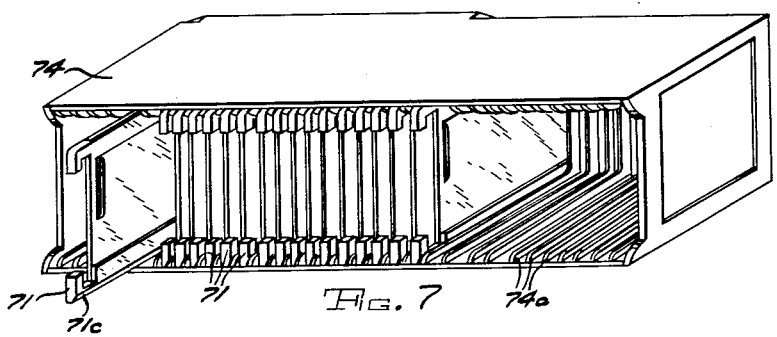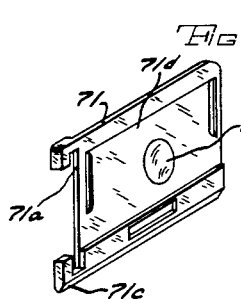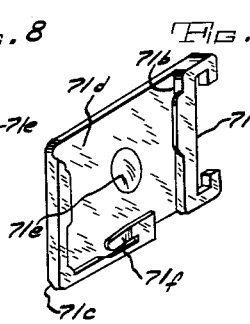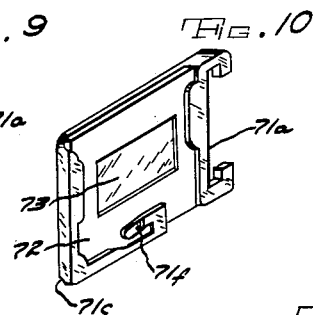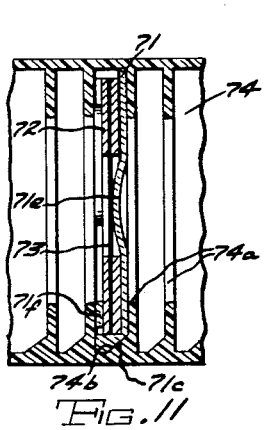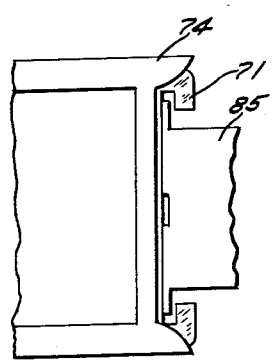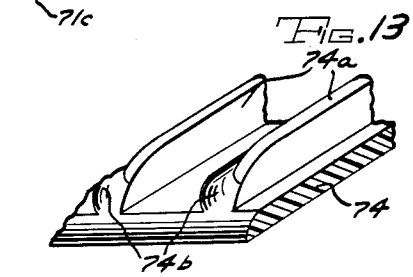

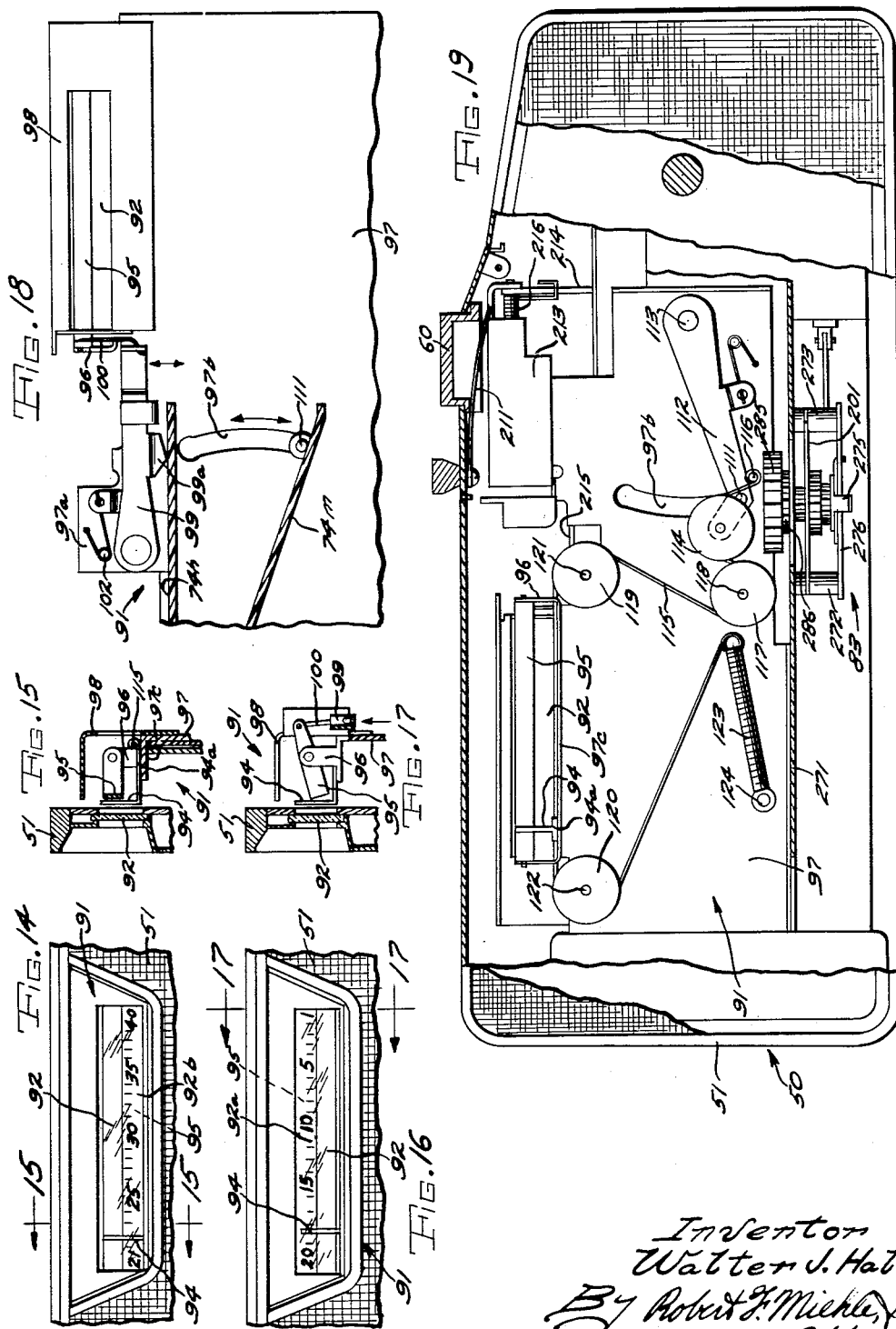

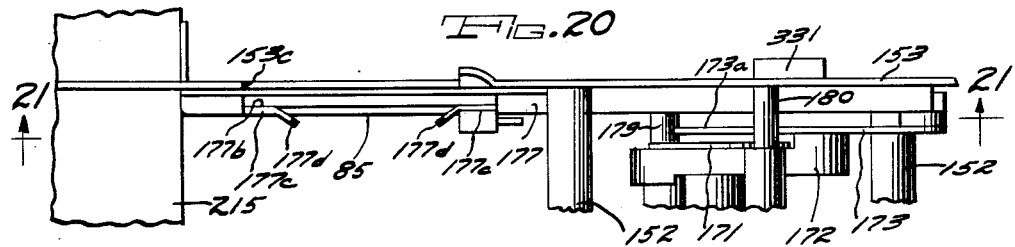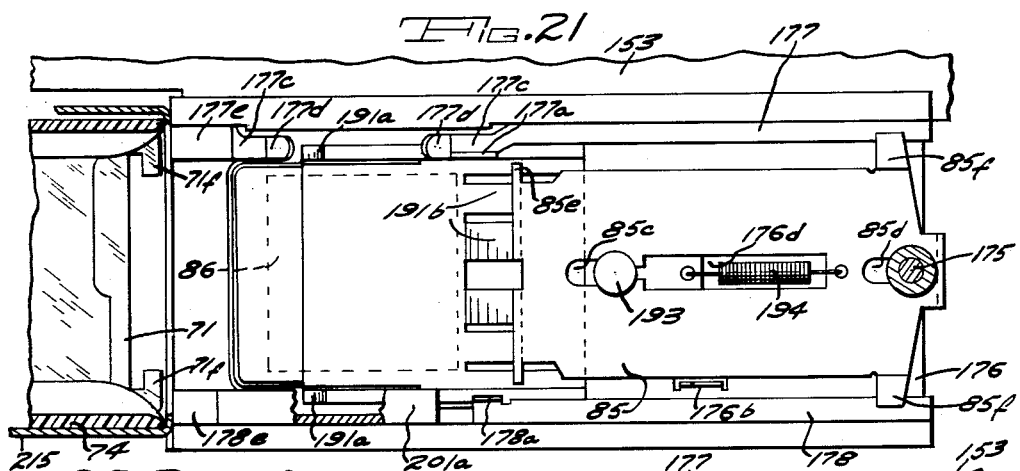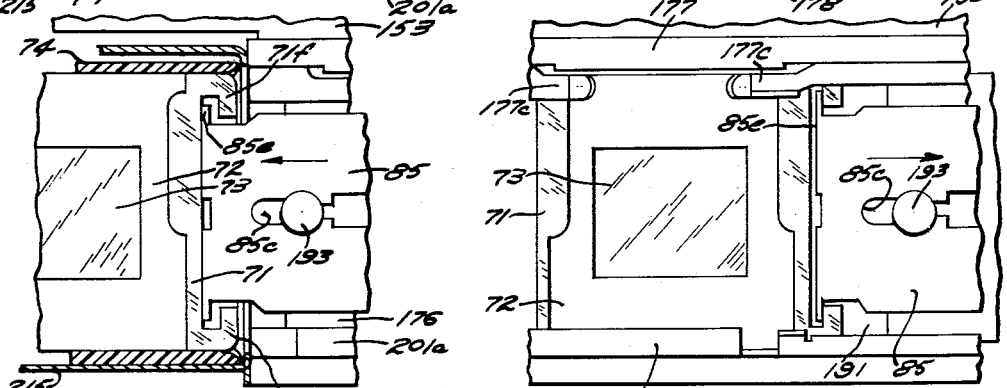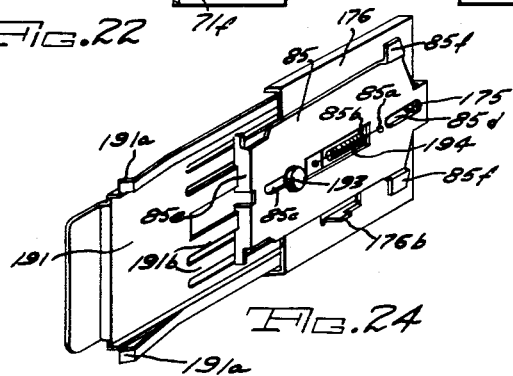

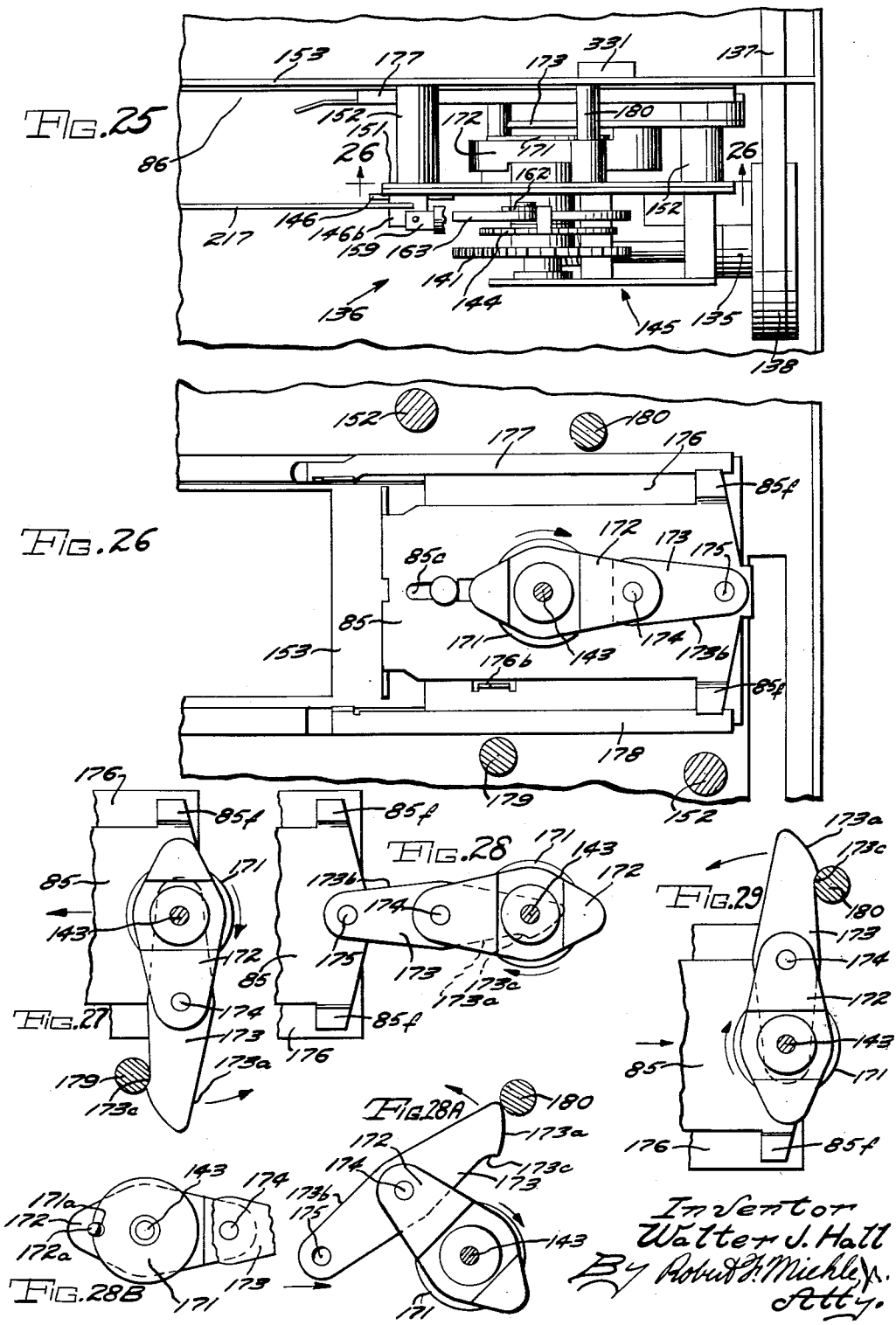

March 6, 1962 W. J. HALL 3,023,669
SLIDE PROJECTOR
Filed March 2, 1959 13 Sheets-Sheet 9
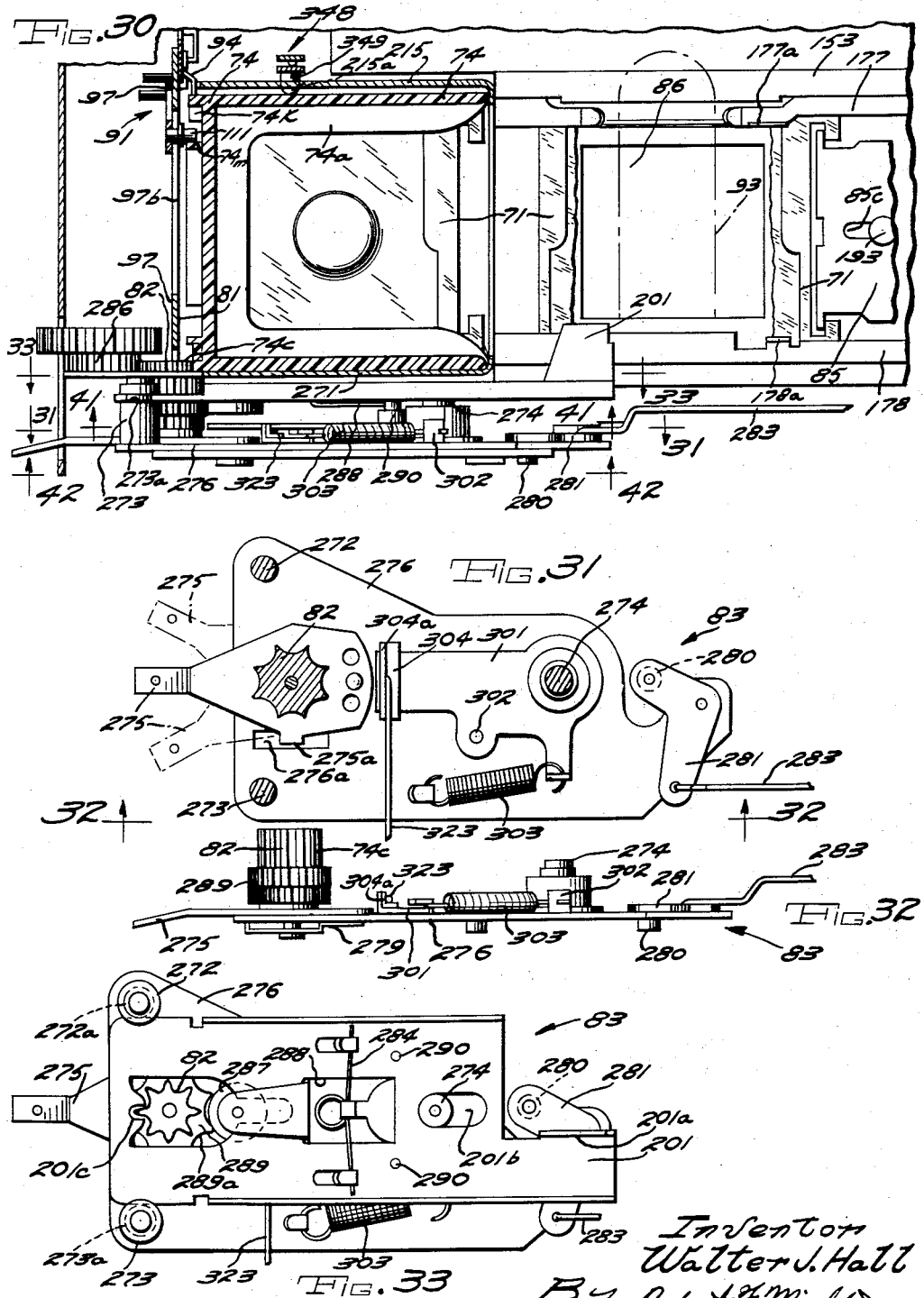

March 6, 1962  W. J. HALL  3,023,669
SLIDE PROJECTOR
Filed March 2, 1959  13 Sheets-Sheet 10
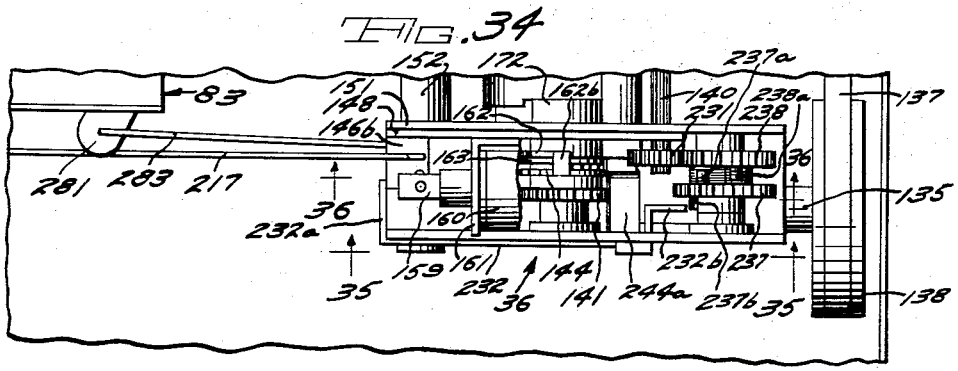
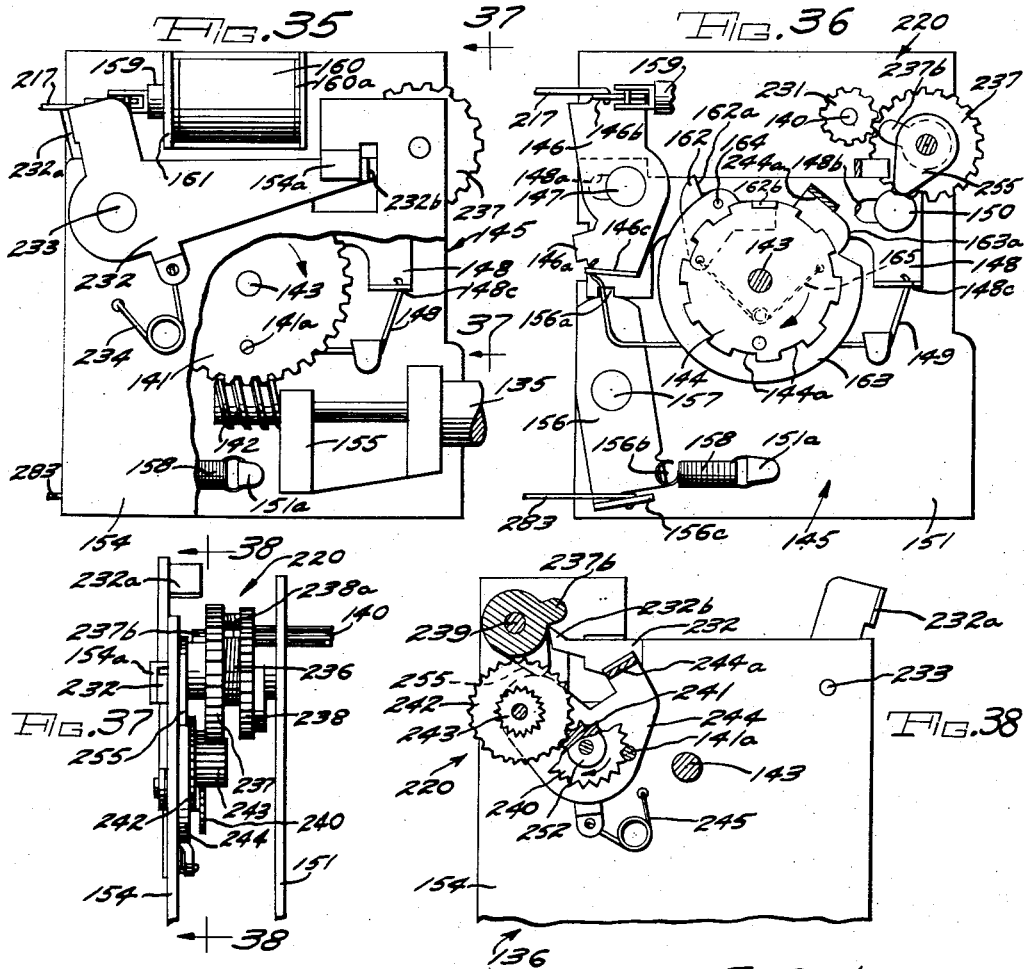
Inventor
Walter J. Hall
By Robert H. Miehle
Atty.

March 6, 1962 W. J. HALL 3,023,669
SLIDE PROJECTOR
Filed March 2, 1959 13 Sheets-Sheet 12
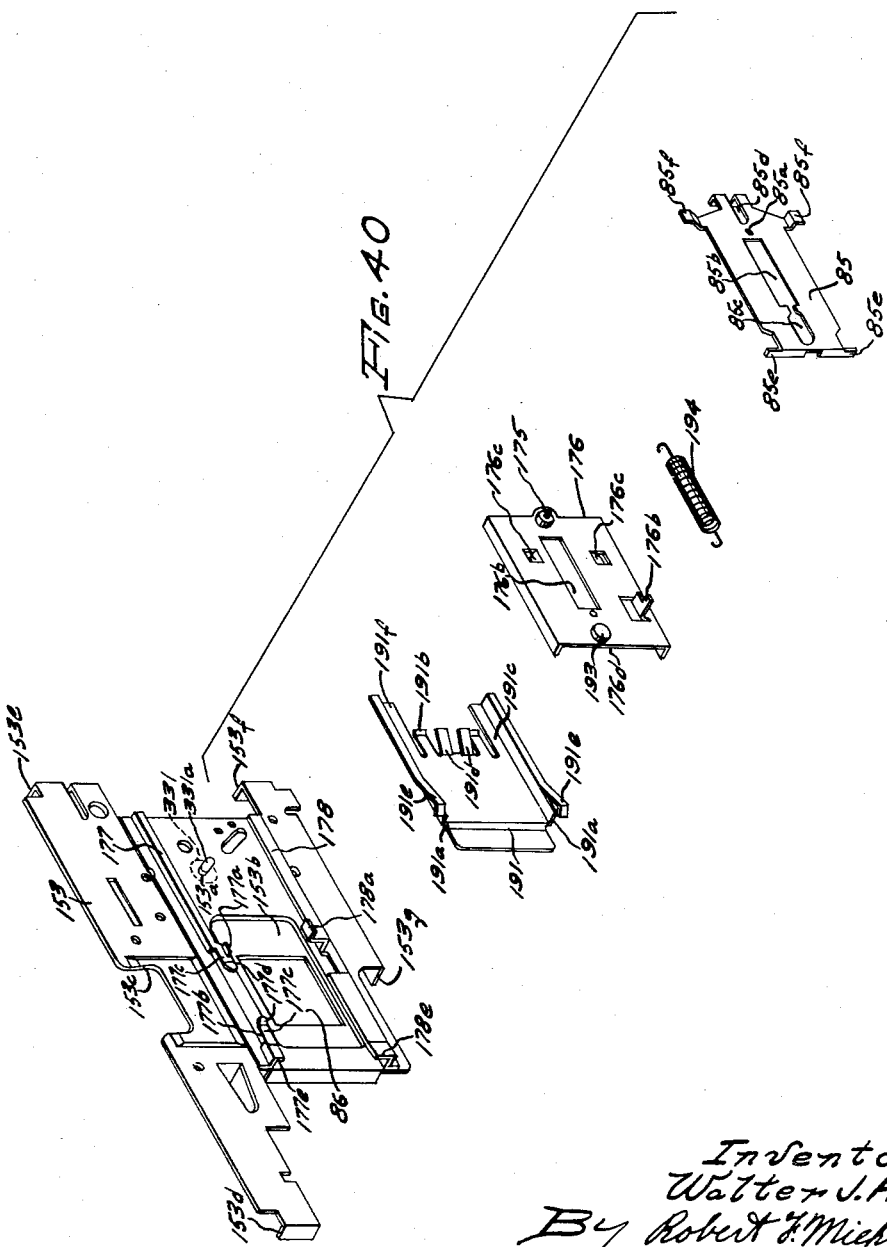
Inventor
Walter J. Hall
By Robert J. Miehle Jr.
Atty.

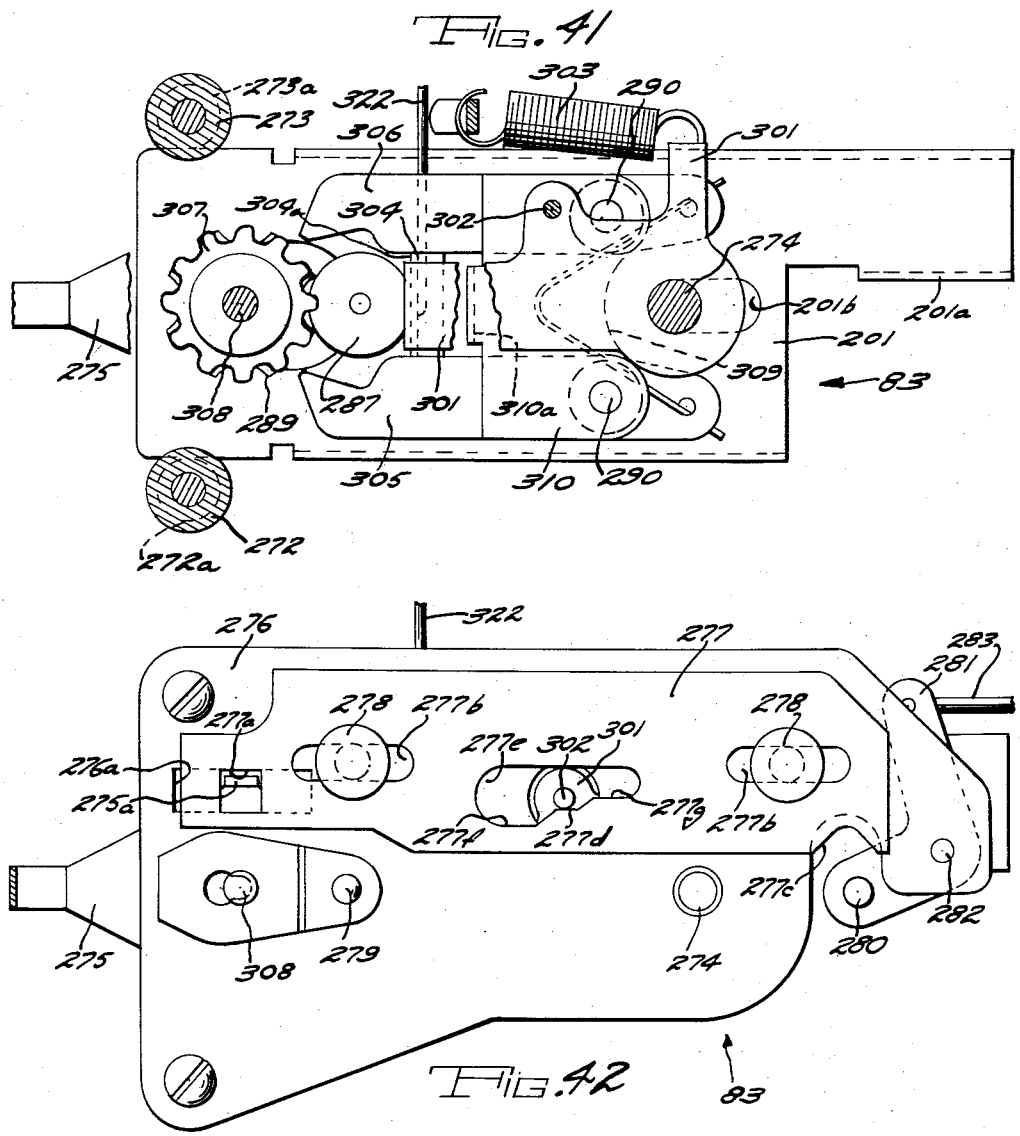

United States Patent Office 3,023,669
Patented Mar. 6, 1962

3,023,669
SLIDE PROJECTOR
Walter J. Hall, Chicago, Ill., assignor to Bell & Howell Company, Chicago, Ill., a corporation of Illinois
Filed Mar. 2, 1959, Ser. No. 799,404
6 Claims. (Cl. 88—28)

This invention relates to a slide projector, and has for an object thereof the provision of a new and improved slide projector.

Another object of the invention is to provide a new and improved tray advancing mechanism in a slide projector.

Another object of the invention is to provide a new and improved control system in a slide projector.

Still another object of the invention is to provide a counter mechanism in a slide projector for indicating which of a plurality of slides is at the projection station.

Still another object of the invention is to provide a new and improved long throw crank mechanism in a slide projector.

Yet another object of the invention is to provide a slide projector in which a slide at the projection station may be removed from and reinserted into the slide projector for editing.

Another object of the invention is to provide a new and improved timer in a slide projector.

A further object of the invention is to provide a new and improved single revolution clutch mechanism in a slide projector.

A still further object of the invention is to provide a new and improved lens-adjusting mechanism in a slide projector.

A complete understanding of the invention may be obtained from the following detailed description of a slide projector forming a specific embodiment thereof, when read in conjunction with the appended drawings, in which:

FIG. 3 is an enlarged, top plan view of the slide projector shown in FIG. 1 with portions thereof broken away;

FIG. 4 is an enlarged vertical sectional view taken along line 4—4 of FIG. 3;

FIG. 5 is an enlarged bottom plan view of the slide projector shown in FIG. 1 with portions thereof broken away;

FIG. 6 is a perspective view of a slide tray for use in the slide projector shown in FIG. 1;

FIG. 7 is a perspective view of the slide tray shown in FIG. 6 together with slide holders;

FIGS. 8, 9 and 10 are perspective views of one of the slide holders shown in FIG. 7;

FIG. 11 is a vertical sectional view of the tray and a slide holder shown in FIG. 7;

FIG. 12 is an end view of the tray and slide holder shown in FIG. 7 together with a slide holder actuator of the slide projector;

FIG. 13 is an enlarged, fragmentary, perspective view of the tray;

FIG. 14 is an enlarged, fragmentary, side elevation view of a counter mechanism of the slide projector shown in FIG. 1;

FIG. 15 is a vertical sectional view taken along line 15—15 of FIG. 14;

FIG. 16 is a view similar to FIG. 14 with parts thereof shown in positions different from those shown in FIG. 14;

FIG. 17 is an enlarged vertical sectional view taken along line 17—17 of FIG. 16;

FIG. 18 is an enlarged, fragmentary, vertical sectional view taken along line 18—18 of FIG. 3 and showing the counter mechanism;

FIG. 19 is an enlarged side elevation view of the slide projector shown in FIG. 1 with portions thereof broken away to show the counter mechanism;

FIG. 20 is a fragmentary top plan view of the slide pulling and pushing mechanism and the projection station of the slide projector shown in FIG. 1;

FIG. 21 is an enlarged vertical sectional view taken along line 21—21 of FIG. 20;

FIG. 22 is an enlarged vertical sectional view showing the slide tray together with the slide holder pushing and pulling mechanism;

FIG. 23 is an enlarged front elevation view of the projection station and adjacent structure of the slide projector shown in FIG. 1;

FIG. 24 is a perspective view of the slide holder pushing and pulling actuator mechanism;

FIG. 25 is an enlarged top plan view of the crank, timer and clutch mechanisms for driving the slide holder pushing and pulling actuator;

FIG. 26 is an enlarged vertical sectional view taken along line 26—26 of FIG. 25;

FIGS. 27, 28 and 29 are enlarged vertical sectional views of the crank mechanism of the slide projector showing the crank mechanism in different positions during its operation;

FIG. 28A is a view similar to FIG. 28 but with the elements shown therein in different positions than in FIG. 28;

FIG. 28B is a fragmentary elevation view of the slide changer from the opposite side thereof from that shown in FIG. 28;

FIG. 30 is an enlarged vertical sectional view taken along line 30—30 of FIG. 4;

FIG. 31 is an enlarged horizontal sectional view taken along line 31—31 of FIG. 30 and showing a portion of the tray advancing ratchet drive of the slide projector shown in FIG. 1;

FIG. 32 is a view taken along line 32—32 of FIG. 31;

FIG. 33 is a view taken along line 33—33 of FIG. 30;

FIG. 34 is an enlarged top plan view of the timer and clutch mechanisms of the slide projector shown in FIG. 1;

Figure 1:
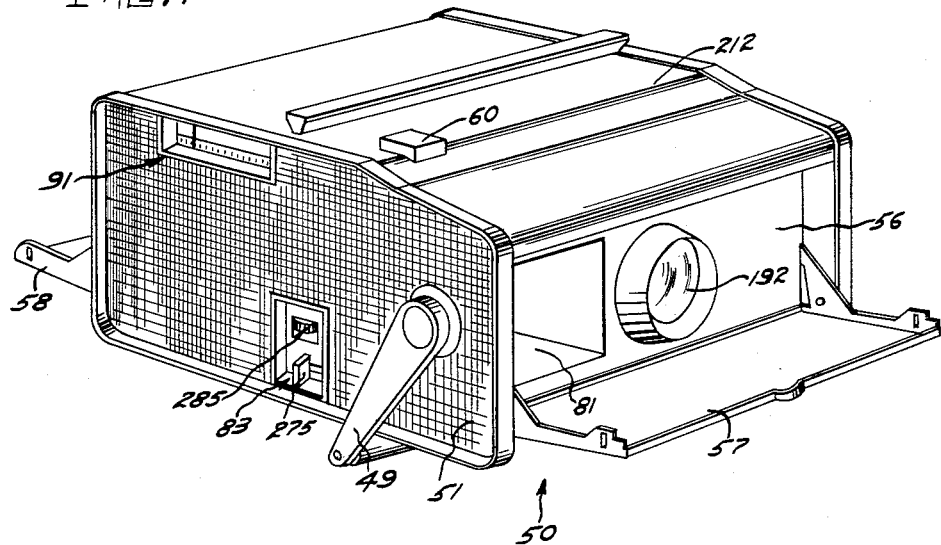
FIG. 1 is a perspective view of a slide projector forming one embodiment of the invention.
Figure 39:
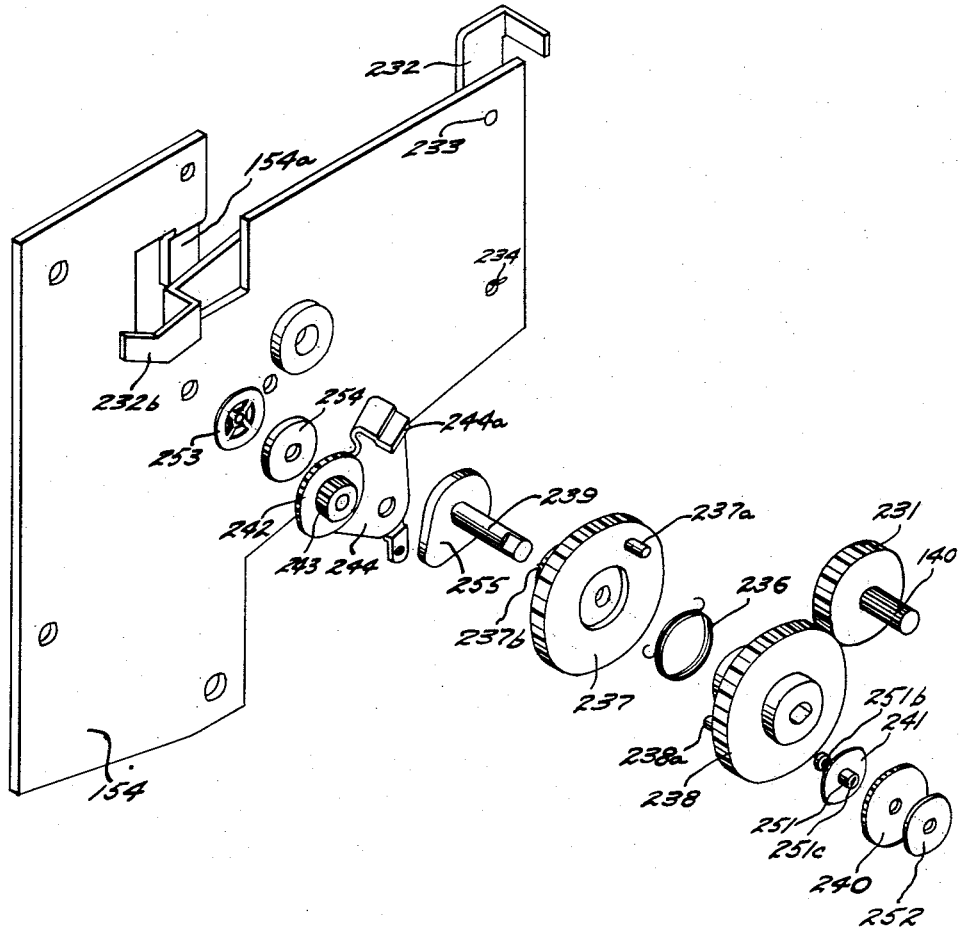

FIGS. 35 and 36 are vertical views taken respectively along lines 35—35 and 36—36 of FIG. 34;

FIG. 37 is a vertical view taken along line 37—37 of FIG. 35;

FIG. 38 is a vertical view taken along line 38—38 of FIG. 7;

FIG. 39 is an exploded perspective view of the timer of the slide projector shown in FIG. 1;

FIG. 40 is an exploded perspective view of the slide changing mechanism of the slide projector shown in FIG. 1.

FIGS. 41 and 42 are horizontal sectional views taken along lines 41—41 and 42—42, respectively, of FIG. 30.

The invention provides a slide projector which may have a flat casing having a handle which may be turned from a carrying position to one acting as supporting legs for the projector when the projector is in use. A tray carrying slide holders is indexed along an enclosed guideway by a reversible ratchet mechanism, and a counter mechanism may be provided to indicate the particular slide which is being shown at a projection station. A pushing and pulling actuator is provided and is driven by a single revolution clutch controlled selectively either manually or automatically by a timer to sequentially pull one of the slide holders in the tray from the tray to the projection station and then push the slide holder back into the tray and actuate the tray indexing ratchet mechanism. The slide holder is moved by the actuator along a guideway to and from the projection station and, for the purpose of editing, the guideway is open at the top at the projection station to permit withdrawal of a slide mount from the slide holder and reinsertion thereof. A shutter is slidable by the actuator to a position closing the light path as the slide holder is moved out of the projection station and requires the presence of a slide holder during the pulling stroke of the actuator to be moved out of the light path so that when there is no slide holder in the portion of the tray at the guideway to the projection station and the actuator is reciprocated, the light path remains closed. When the actuator pulls a slide holder to the projection station, the shutter is moved out of the light path and actuates the drive of the actuator to cause the actuator to dwell until the drive is actuated manually or by the timer. When in manual operation, the drive preferably may be actuated either by a pushbutton on the projector or by a switch in a hand indicating pointer. The projection lens may be adjusted by a screw operable at the back of the projector to move a slide carrying the projector lens.

Figure 2:
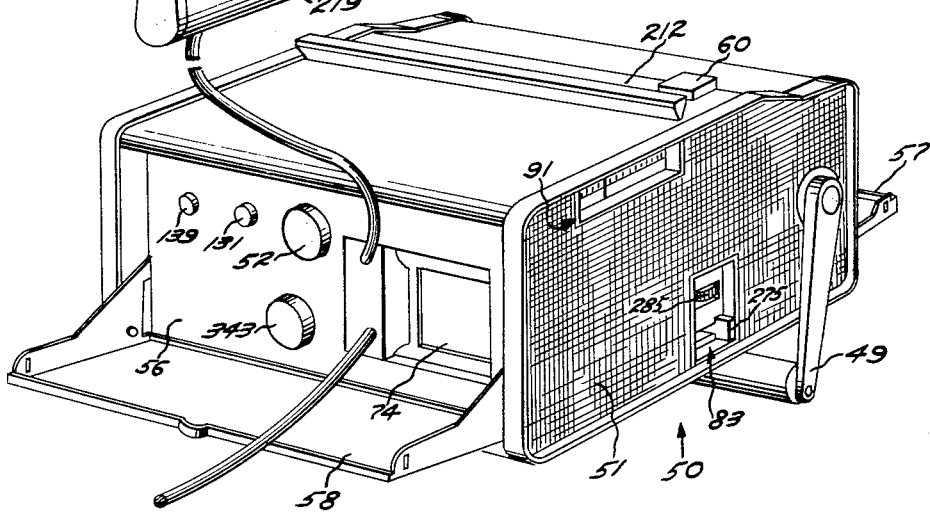
FIG. 2 is a perspective view of the slide projector shown in FIG. 1.

Referring now in detail to the drawings, a slide projector 50 has a casing 51 made in the general shape of a carrying case with a handle 49 movable between a carrying position as illustrated in FIG. 4 to a projection position illustrated in FIGS. 1 and 2 in which the handle serves as the front support of the projector. To vary the tilt of the projector, a knob 52 (FIG. 4) may be turned manually to adjust the position of a rear support 53 through a rack and pinion 54, the support 53 having the rack integral therewith and being slidable in a vertical guideway 55 secured to rear panel 56. Front and rear doors 57 and 58 are hinged to the casing and are spring-urged to their open positions. Latches 59 are actuated by pressing pushbutton 60 to release the doors from their closed positions, and then swing by spring action to their open, horizontal positions.

Slide holders 71 (FIGS. 7 and 8) of transparent material and T-shaped slots 71a therein are adapted to receive slide mounts 72 of known construction in guideways 71b open at the top to permit the slide mounts to be slid upwardly out of the mounts and slid downwardly into the slide holders. The slide holder is disclosed and claimed in copending application Serial No. 786,199 for "Projection of Slides" and assigned to the same assignee as the present application. The slide holders have beveled or relieved lower rear corner portions 71c adapted to permit each slide holder to be inserted between a pair of adjacent septums 74a of a slide tray 74 only in a position in which a panel 71d of the slide holder is at the rear of the slide mount, and the panel has a forwardly projecting bubble 71e which locks the film 73 in focused position when heated at the projection station during projection. As shown in FIGS. 11 and 13, the guideways formed by the adjacent septums have bevelled or filled righthand lower corner portions 74b complementary to the bevelled edges 71c of the slide holders so that the slide holders can be inserted into the guideways only with the panels 71d at the rear. The slide holders 71 also have spring fingers 71f for pressing against the lower portions of the septums 74a to retain the slide holders in the tray against accidental removal thereof.

The tray 74 fits slidably in a tray guideway 81 (FIGS. 1 and 2) in the projector and is movable along the guideway 81 by a pinion 82 (FIG. 30) driven by a ratchet tray indexing mechanism 83 and meshing with a rack 74c of the tray. On each actuation of the indexing mechanism, the tray is moved to move one slide holder out of alignment with a slide holder pushing and pulling actuator 85 and the next succeeding slide holder in the next guideway in the tray comes into alignment with the actuator for movement to a projecting station or framing aperture 86. The indexing mechanism may be actuated selectively to step the tray forwardly or in the reverse direction as desired by the user.

The tray 74 has guideways for receiving forty slide holders 71, and to indicate which of the slide holders is at the projection station 86, a counter or indicator 91 (FIGS. 14 and 16) is provided. The counter has a transparent window 92 mounted in an opening in the casing 51, and the window has scales 92a and 92b of which the scale 92a only is illuminated from a projection lamp 93 (FIGS. 3 and 30) when any of the first twenty slide holders is at the projection station. When any of the last twenty slide holders in the tray is at the projection station, the scale 92a (FIGS. 14 and 16) is shaded or masked from the lamp 93 and only the scale 92b is illuminated. A pointer 94 is silhouetted on the window pane 92 to indicate the number on the scale 92a or 92b of the particular slide being shown at the projection station. The marking is effected by a masking plate 95 pivotally mounted on a bracket 96 of a panel 97 forming one side of the tray guideway or tunnel 81. A guard 98 covers the top of the mask. When the tray is in a position in which any of the first twenty slide holders is at the projection station, a cam follower 99a of an arm 99 (FIGS. 6 and 18) rides on an upper ledge 74g of the tray extending along the front half of the tray and holds the mask 95 down through a link 100. The arm 99 is pivotally mounted on a pin 102 on a mounting tab 97a of the panel 97 and is urged downwardly by a torsion spring 101 bearing against an ear 97b of the arm 97 and mounted on pin 102. When the tray is in a position in which any of the last twenty slide holders is at the projection station, the cam follower 99a is dropped by the spring 102 into a depressed or lower ledge 74h extending along the rear half of the tray. The tray has an inclined forward starting portion 74i of the ledge 74g and an inclined or sloped connecting portion 74j and the cam follower 99a is sloped at the bottom to ride smoothly up and down the portions 74i and 74j. Near the ends of the tray, blocking ribs 74k which prevent insertion of the tray in the guideway past the pinion 80 (FIG. 30) if the tray is inserted into the guideway in a position inverted from the correct position thereof. Hence, the tray can be inserted past the gear 82 to the actuator 85 only with the slide holders in forwardly facing positions. This insures that the films of the slides are always in focus when projected.

To move the pointer 94 (FIGS. 14 to 19) along the scales 92a and 92b to indicate the number of the slide holder 71 at the projection station 86, the tray is provided with an inclined ledge or cam 74m (FIG. 6) which slopes upwardly from both ends to the center of the tray. A follower pin 111 projecting through an arcuate slot 97b (FIGS. 18 and 19) and rests on and is movable by the cam 94m as the tray is moved along the guideway during indexing. The pin is carried near the free end of arm 112 pivotally mounted on the panel 97 by post 113. The arm 112 also carries a grooved pulley 114 thereon over which a flexible cord 115 extends. One end of the cord is secured to a post 116 fixed to the panel 97, and the cord travels therefrom over the pulley 114, under pulley 117 mounted on post 118 fixed to the panel 97, over pulleys 119 and 120 mounted on posts 121 and 122 fixed to the panel 97 and then to the free end of a coiled torsion spring 123. The lefthand end of the spring 123 is fixed rigidly by rivet 124 to the panel, and the spring pulls the cord taut on the pulleys 114, 117, 119 and 120. The pointer 94 is secured to the cord 115 by a clamping portion of the pointer and has a slide portion 94a which slides along a horizontal ledge or guideway 97c. The post 116 acts as a lower stop for the arm 112, and as the arm 112 is lifted by the cam 74m as the tray is indexed, the pulley 114 is raised to pull the cord and the pointer 94 along the sealed window 92 to indicate always the position of the tray in the tray guideway in the projector. Thus, the user always may determine the number of the slide which is being projected from a glance at the indicator 91.

A control switch 131 (FIG. 3) mounted on the panel 56 is provided to turn electric motor 132 on and off, and the motor drives a cooling fan 133 and a pulley 134. The pulley 134 drives a drive shaft 135 of a clutch and timer assembly 136 through belt 137 and pulley 138. The timer assembly may be set or adjusted by a control knob 139 and shaft 140 to control the period of projection of each slide. The shaft 135 is rotated continuously and turns a gear 141 (FIG. 35) through a worm 142. The gear 141 turns a shaft 143 continuously which has a notched disc 144 (FIG. 36) of a one revolution clutch 145 keyed thereto. When a lever 146 is pivoted on a post 147 in a counter-clockwise direction, as viewed in FIG. 36, after slide plate 148 has been previously withdrawn to the right by clockwise movement of the lever 156 against the action of torsion spring 149, the lever 146 moves a stopping lug 146c to a clutch stopping position, the withdrawal of the plate 148 providing clearance for movement of the lug 146a. The plate 148 is mounted slidably on the post 147 and a post 150 by means of slots 148a and 148b, which limit the extreme positions of the plate 148. The posts 147 and 150 are mounted on a fixed mounting plate 151 mounted on studs 152 secured to a vertical wall 153 (FIG. 25). The shaft 143 is journalled in a mounting plate 154 (FIGS. 34 and 35) fixed to the plate 151 by a spacing frame 155. Normally the lever 146 is urged toward an extreme clockwise position by lug 146a and slide 148 which is connected by a lug tooth 156a (FIG. 36) of a lever 156 mounted pivotally on stud 157 carried by the mounting plate 151 and urged in a counter-clockwise direction by tension spring 158 connected to tabs 151a and 156b. A solenoid plunger 159 pinned to a tab 146b of lever 146 limits the extreme movement in one direction of the element 146, the solenoid plunger butting against an end plate 160a of solenoid winding 160 which is fixed to the mounting plate 151 by a bracket 161.

When the slide or plate 148 is the extreme lefthand position shown in FIG. 36, a lug 148c thereof lies in the path of a dog 162a of a keying or clutching lever 162 pivoted on a driven clutch 163 by a pin 164. When the dog 162a engages the lug 148c, the lever 162 is pivoted counter-clockwise and swings lug 162b out of one of notches 144 to break the driving connection between the discs 144 and 163 and stop the disc 163 in a precisely oriented position. When the slide 148 is moved to its right hand position, the lug 148c moves out of engagement with the dog 162a, the dog 162a then pivots by a torsional spring 164 in a clockwise direction and the lug 162b enters one of the notches 144a to key the disc 163 to the disc 144. Then, assuming the lever 146 to be released to move to its extreme clockwise position moving lug 146c out of the path of the dog 162a, and the slide 148 to be spring returned again to its extreme lefthand position, the disc 163 is rotated one revolution and the dog 162a again engages the lug 148a and is pivoted out of engagement with the disc 144. If, after the slide 148 is moved to the right to cause the lever 162 to drivingly connect the discs 144 and 163, the lever 146 is kept in its extreme counter-clockwise position in which the lug 146c thereof is in the path of the dog 162a, the dog 162a engages the lug 146c and is pivoted to its declutching position after the disc 163 has been rotated precisely one-half of one revolution. Then, when the lever 146 is swung clockwise, as viewed in FIG. 36, out of engagement with the dog 162a, the lever 162 swings to a clutching position and the disc 163 is turned one-half of one revolution until the dog 162a engages the lug 148c and is moved to its declutched position.

The disc 163 is axially aligned with the disc 144 and is mounted on a shaft 171 (FIG. 26) journalled in the mounting plate 151. A crank arm 172 is keyed to the shaft 171 on the opposite side of the plate 151 from that of the disc 163 and is rigidly driven by the disc 163 whenever the disc 163 is clutched to the disc 144. A connecting rod 173 is pivotally connected by a pin 174 to the side of the crank arm opposite to the shaft 171 and is connected by a pin 175 to a drive plate 176 carrying the slide changer or actuator 85 thereon. Rotation of the crank arm 172 one-half of one revolution moves the drive plate a distance four times that between the axes of the shaft 171 and pin 174, the distance between the axes of pins 174 and 175 being equal to that between the axes of the shaft 171 and pin 174. Thus, the throw of the crank arm and connecting rod is twice the throw of the crank arm itself. The drive plate 176 is slidably mounted for movement along the face of the wall 153 by guide rails 177 and 178 fixed to the wall 153 between an extreme righthand position or projecting as shown in FIGS. 21 and 26 and an extreme lefthand or indexing position as shown in FIG. 22. When the shaft 171 is rotated clockwise to move the plate 176 from its projecting position as illustrated in FIG. 26, through almost the first ninety degrees of turning of the crank arm 172 the crank arm pulls the connecting rod 173 and the drive plate 176 to the left, the plate 176 being confined to a straight-line movement by the guiderail 178 causes the connecting rod to swing to the position thereof shown in FIG. 27 in which an arm 173a thereof swinging behind a post 179 and into engagement therewith. Then, on continued rotation of the crank arm 172, the connecting rod 173 is moved over-center by restraining action of the post 179 and the portion 173b connected to the drive plate 176 is swung out ahead of the pin 174. The portion 173a has a slight cam lobe 173c which aids in swinging the arm 173 overcenter relative to the pin 174 and shaft 171. During the next one-half revolution of the shaft 171, the crank arm 172 pulls the connecting rod 173 and drive plate 176 from the positions thereof shown in FIG. 28 to those shown in FIG. 29, the arm 173a swinging counter-clockwise up behind fixed post 180 pushing the arm 173 overcenter during the middle portion of the one-half revolution, and the crank arm then pushes the portion 173b on ahead of the pin 174 to the position thereof shown in FIG. 26 at the end of this one-half revolution.

The disc 163 (FIGS. 35 and 36) is keyed to the shafts 143 while the gear 141 and disc 144, which are keyed together, are freely rotatable on the shaft 143 except when connected drivingly to the shaft by the driven clutch disc 163. The shaft 143 has a detent disc 171 (FIG. 28B) rigidly connected thereto, and the crank arm 172 is rotatable on the shaft 143 except as keyed thereto by a ball detent 172a mounted in a bore in the arm 172 and urged by a spring (not shown) in the bore outwardly into a notch or slot 171a in the disc. The ball detent 172a and the slot 171a key the crank arm 172 to the shaft 143 to drive the arm 172 positively while permitting slippage in the case of extreme overload as in a jam.

As illustrated in FIG. 28A, the lobe 173c of the connecting rod 173 engages the post 180 when the crank arm 172 has moved about forty-five degrees from its extreme throw or horizontal position. For roughly the next ninety degrees of rotation of the crank arm 172, the lobe 173c engages the post 180 and the post 180 is acting as a fulcrum to aid in rotating the connecting rod 173 in the opposite direction to the rotation of the crank arm 172. Thus, the arm 173a and post 180 in addition to moving the connecting rod 173 overcenter also act to increase the leverage on the rod 173 from the crank 172 during the portions of the revolution of the crank in which the leverage of the crank alone on the rod 173 would be lowest.

When the drive plate is in its extreme righthand position as illustrated in FIG. 23 and the actuator 85 is in engagement with a slide holder 71, the engaged slide holder is at the projection station and is in the guideway formed by the wall 153 and guide rails or channels 177 and 178. In this position, a shutter plate 191 has been engaged at shoulders 191a by corner hook portions 71f of the slide holder and pushed back along the guideway out of the projection station 86. Light from the lamp 93 (FIG. 3) at this time is focused on the front of the transparency 73 and projected through an optical objective 192 onto a screen (not shown). Then when the one-revolution clutch 145 (FIG. 36) is actuated to drive the crank arm 172 (FIG. 26) one revolution, the drive plate 176 reciprocates the actuator 85 once. The actuator 85 is carried by the pin 175 and a pin 193 (FIG. 24) and is urged to the left or ahead of the drive plate 176 by a tension spring 194 fixed to a tab 176a of the drive plate 176 and a hole 85a in the actuator 85, a slot 85b providing clearance for the spring. The actuator 85 has slots 85c and 85d providing limited travel between the pins 175 and 193 on the drive plate 176 and the actuator. The actuator is formed of thick sheet metal and has a pushing and pulling end 85 extending at right angles to the body so that the lefthand end portion of the actuator, as viewed in FIGS. 22 and 24, is essentially T-shaped and fits interlockingly in the T-shaped slot 71a in the slide holder 71.

During the movement to the left of the drive plate 176, the plate 85 pushed the slide holder 71 away from the projection station 86 back completely into the tray 74, and then offset ears 85f extending outside of the rails 177 and 178 engage stop tabs 177a and 178a (FIG. 21) and further travel of the actuator is prevented. However, the drive plate 176 continues on to the left further while the actuator 85 remains stationary. In the further travel of the drive plate 176, a rigid, laterally projecting, pushing or indexing lug 176b engages a rigid, upstanding lug 201a of an actuating plate 201 (FIGS. 30 and 33) of the tray indexing mechanism 83 and slides the plate 201 to the left to actuate the indexing mechanism 83 to turn the gear 82 one tooth to move the tray 74 along the guideway a distance just sufficient to move the next slide holder 71 over the T-shaped end of the actuator 85. Then the crank 172 and connecting rod 173 (FIG. 28) start to pull the drive plate 176 back along the guideway, and the drive plate picks up the actuator 85 and pulls it and the next slide holder 171 along the guideway to position the slide holder in the projection station 86 (FIG. 21) at which point the clutch mechanism 145 declutches and the slide carried by the holder is projected.

As the slide holder 71 is moved to the projection station, it pushes the shutter 191 (FIG. 191) back out of the projection station.

The drive plate 176 is channel-shaped, and for pushing the shutter 191 (FIG. 40) to the projection station, the drive plate 176 has inwardly projecting tabs 176c for engaging ends of spring arms or fingers 191b and 191c of the shutter until the shutter comes to its position covering the aperture 86 at which time forwardly projecting spring arms or fingers 191d bearing against the back or inner face 176d of the drive plate 176 push the shutter into a recess 153b in the wall 153 which moves the arms 191b and 191c out of engagement with the tabs 176c to disconnect the shutter from driving engagement with the plate 176 and permit the plate 176 to reciprocate back and forth over the shutter 191 without moving the shutter. However, when a slide holder is pulled to the projection station, the slide holder engages the shoulders 191a of the shutter and push the shutter out of the recess 153b and out of the projection station. Spring fingers 191e of the shutter bear against either the inner walls of the rails 177 and 178 or against the inner face of the drive plate 176, depending on the relative positions of the shutter and drive plate, to act with the spring arms 191d to hold the shutter in the recess 153b except when the shutter is moved out of the recess by a slide holder. The drive plate 176 has a slot 176d to provide clearance for the spring 194. The fingers 191e extend from elongated guide arms 191f.

For editing, the slide mount 72 in the slide holder 71 at the projection station 86 may be slid upwardly out of the projector and it or another mount inserted. The upper guide rail 177 has an opening 177b at the top of the projection station through which the slide mount may be freely moved, fingers 177c having camming ends 177d and serving to guide the slide holder and the actuator 85. The wall 153 is relieved at 153c to facilitate grasping the slide mount and pulling it out of the holder as well as providing clearance to reinsert the mount in the holder. The rails 177 and 178 have widened entrance ends 177e and 178e to facilitate guiding the slide holder 71 into the guideway formed thereby.

The wall 153 has mounting tabs 153d, 153e and 153f and a lower edge 153g by which the wall is bolted to the side walls of the casing 51 and to the bottom mounting plate 271 (FIG. 19).

The clutch mechanism 145 (FIG. 36) may be actuated manually for one revolution drive by pushing pushbutton 60 (FIG. 19) downwardly against a spring 211 secured to a hinged cover plate 212 and then releasing the pushbutton. The pushbutton pivots a clutch actuator plate 213 mounted on bracket 214 of top plate 215 against the action of a torsion spring 216. This movement of the clutch actuator plate 213 pushes a stiff wire link 217 to the right, as viewed in FIG. 3. The link 217 pushes lever 146 (FIG. 36) momentarily in a clockwise direction to move the lug 146c to the position shown in FIG. 36 and out of the path of the dog 162a of the lever 162. The clutch mechanism 145 then is actuated for one revolution, release of the pushbutton 60 then causing the spring 216 (FIG. 19) to pull the plate 213 and the link 217 and the lever 146 (FIG. 36) back to their previously occupied positions. Alternately, the clutch mechanism 145 may be selectively actuated by the user momentarily depressing a momentary switch 218 of a pointer projector 219 (FIG. 2) to momentarily energize the solenoid 160 (FIG. 35) to momentarily swing the lever 146 clockwise to its clutch actuating position shown in FIG. 36. The above methods of actuation are manually effected by the user, and alternately, for automatic operation, a timer 220 may be adjusted to provide a period of projection of each slide and actuate the clutch mechanism 145 at the end of each period. Either of the manual controls overrides the timer mechanism for a single slide changing operation when actuated manually even when the timer 220 is set in an operative condition, it also being possible to set the timer in an inoperative condition for solely manual control of the slide changing apparatus.

The timer 220 is best illustrated in FIGS. 34 to 39 and, except for a gear 231 keyed to the timer setting shaft 140, is mounted as a unitary assembly on the mounting plate 154. The timer has a clutch actuating lever 232 pivotal on pin 233 fixed to the plate 151. The lever 232 is biased by a spring 234 in a clockwise direction, as viewed in FIG. 35, toward a normal or inoperative position as limited by a combined guide and stop arm 154a of the plate 154. When the lever 232 is pivoted by the timer in a clockwise direction, a projecting lug 232a engages and moves the lever 146 (FIG. 36) clockwise to actuate the clutch mechanism 145 to start a revolution thereof. Assuming the timer 220 to be in its zero position, a spring 236 secured to pins 237a and 238a (FIG. 39) of gears 237 and 238 biases the gear 237 counterclockwise on shaft 239 to a start or zero position in which the pin 237a engages the pin 238a, the gear 237 being freely rotatable shaft 239 and the gear 238 being keyed to the shaft 239 which is journalled in the mounting plates 151 and 154. The gear 141 (FIG. 35) is continuously rotated at a uniform speed, and, on each rotation thereof, a pin 141a meshes with and turns a gear 240. The gear 240 turns a gear 241 therewith which meshes with and turns a gear 242 to turn gear 243 integral with the gear 242. The gear 243 meshes with the gear 237 to turn the gear 237 in a counter-clockwise direction, as viewed in FIG. 9, and, as the timer times out, as cam 237b integral with the gear 237 engages offset end 232b of the lever 232 and depresses the end 232b. This has the effect of turning the lever 232 clockwise as viewed in FIG.

35 to actuate the clutch 145 to drive the slide changing mechanism through one cycle thereof.

Just after the start of the clutching action of the clutch 145, an offset and outwardly extending cam 163a of the driven clutch disc 163 engages and raises a lug 244a of a mounting lever 244 to swing the gear 243 out of mesh with the gear 237. The gear 237 then is turned back by the spring 236 to its zero position releasing the lever 232, and the lever 232 then permits the lever 146 to swing back to its declutching position to declutch the clutch at the end of the revolution of the clutch disc 163. After a short movement of the disc 163 after resetting the timer 220, the cam 163a moves out of engagement with the lug 244a, and a spring 245 swings the lever in a clockwise direction as viewed in FIG. 38 to swing the gear 243 back into mesh with the gear 237 (FIG. 37) to start the timing cycle.

The lever 244 is mounted rotatably on a shaft 251 (FIGS. 38 and 39) journalled in the mounting plate 154, the gear 241 is integral with shaft 251. The star wheel 240 is frictionally rotatable on the shaft 251 and is pressed against the gear 241 by a cupped, leaf spring washer 252. A snap washer 253 fits in a groove 251b at one end of the shaft 251 and the other end 251c of the shaft 251 is riveted over. The spacing between the end 251c and the washer 253 is such that the spring washer presses tightly against the gear or star wheel 240 and presses the gear 240 tightly against the gear 241 to provide a frictional drive therebetween. This frictional drive slips only when an overload occurs and the elements constitute an overload clutch. To provide a braking force to hold the gears 240, 241, 242, 243 and 237 against movement by the spring 236 when the pin 141a is not in mesh with the gear 240, the nut 253 holds a friction or brake disc 254 of felt, bronze or other brake material tightly against the mounting plate 154. The disc 254 is pressed against the perforated nut 253 to frictionally key the nut to the disc 254 and the shaft 251, and the braking effect resists turning movement of the shaft 251 sufficiently that the spring 236 will not turn the shaft 251 and the drive of the shaft by the pin 141a is cumulative during each timing cycle of the timer.

To render the timer 220 inoperative for solely manual control of the slide changing, the user turns the shaft 140 to turn the shaft 239 in a clockwise direction as viewed in FIGS. 38 and 39 to move a cam 255 keyed to the shaft 239 against the lever 244. This turning of the shaft 140 is continued until the lever 244 is swung counter-clockwise sufficiently to disengage the gears 237 and 243 completely, and the timer 220 is left in this completely inoperative position.

The tray indexing mechanism 83 (FIGS. 19, 30 to 33, 41 and 42) is mounted as a unitary assembly on bottom frame plate 271 by cap screws (not shown) threaded into studs 272, 273 and 274. The studs also guide the actuating plate 201 in a longitudinal movement thereof, the studs 272 and 273 having annular guide grooves 272a and 273a and the plate 201 having a guide slot 201b. The indexing mechanism may be selectively set to move the tray 74 forwardly, move the tray reversely or rearwardly, or in neutral in which movement of the tray is stopped completely, and a manually operable lever 275 is provided for so setting the tray indexing mechanism. The lever 275 is shown in FIGS. 31 and 33 in its neutral position, and when moved to the upper broken-line position thereof of FIG. 31 sets the indexing mechanism in reverse while, when moved forwardly to the lower broken-line position shown in FIG. 31, sets the indexing mechanism for forward indexing.

When in neutral, a tab 275a of the lever 275 projects through a clearance slot 276a of a bottom mounting plate 276 FIGS. 31 and 42) into a slot 277a in a cam plate 277 slidably mounted on the bottom plate 276 by headed pins 278 extending through guide slots 277b and fixed to the plate 276. The lever is retained in this position by a ball detent mechanism 279, and holds the plate 277 in the neutral position thereof as shown in FIG. 42, in which a notch 277c is positioned to receive a pin 280 integral with one end of bellcrank lever 281 mounted on pin 282 fixed to the plate 276. A pull rod 283 connected to the other end of the lever 281 and to a tab 156c (FIG. 36) of lever 156 is pulled continuously by the spring 158 to the right, as viewed in FIGS. 36 and 42, to maintain the pin 280 against the cam plate 277. When the notch 277c is in a position to receive the pin 280, the spring 158 (FIG. 36) is permitted to move the lever 156, the detent plate 148 and the lever 146 to the positions thereof shown in FIG. 36 in which the lug 146c is out of the path of the dog 162a of the clutching lever 162 and the dog 148c is in the path thereof. In this position, the dog 148c causes the clutch discs 163 and 144 to be declutched at the position of the crank arm 172 shown in FIG. 28 in which the actuator 85 and drive plate 176 are in their index positions as shown in FIG. 22. In this position, the drive plate 176 has moved the actuating plate 201 against spring 284 from the normal position of the plate 201 as shown in FIG. 33 to the left to move a locking notch 201c out of interlocking engagement with the indexing gear 82. This permits a handwheel 285 (FIG. 30) integral with a gear 286 to be turned manually, and the gear 286 turns the gear 82 to move the tray along the guideway 81. A detent roller 287 normally is urged by a slide 288 into one of indexing notches 289a in detent wheel 289 integral with the gear 82. The slide 288 is slidably mounted on the actuating plate 201 by headed studs 290 (FIG. 30) and is interconnected with the plate 201 by the spring 284 (FIG. 33). The spring 284 normally maintains the plate 201 in its furthermost righthand position as shown in FIG. 33 and urges the detent roller 287 to the left against the detent wheel 289.

When the cam plate 277 is in its neutral position as illustrated in FIG. 42, a holdout arm 301 is spring-pressed to hold a pin 302 on an intermediate face 277d of a stepped cam slot 277c in plate 277, a tension spring 303 (FIG. 41) secured to the arm 301 and the plate 277 serving to bias the arm 301. In this neutral position of the arm 301, a tab 304a of a hardened wear plate 304 holds both a reversing ratchet pawl 305 and a forward ratchet pawl 306 away from a ratchet gear 307 integral with the gear 82 and detent wheel 289 so that reciprocation of the actuating plate 201 does not affect the position of the gear 307. The integral gear 82, wheel 289 and gear 307 are mounted rotatably on post 308 fixed to the plate 276. When the lever 275 is swung clockwise, as viewed in FIGS. 41 and 42, to its forward-indexing position, it slides the camming plate 277 to the right to pivot bellcrank lever 281 counter-clockwise and move cam face 277f to the pin 302. The lever 281 actuates the clutch mechanism 145 (FIG. 36) to swing the lever 156 clockwise to move the detent plate 148 to the right and hold it there in a position holding lug 148c out of the path of the clutching lever 162 and permitting the lever 146 to swing counter-clockwise to position the lug 146c in the path of the lever 162. This makes the start and stop of each revolution of the driven clutch plate 163 and crank arm 172 (FIG. 26) from the projection position thereof as shown in FIG. 26, and only the lever 146 (FIG. 36) is operative to control the clutch mechanism 145, the lug 148c being held out away from the clutch controlling lever 162. Also, the camming plate 277 (FIG. 42) in its forward or righthand position permits the pin 302 on lever 301 to come to the cam face 277f and the lever 301 to be moved by the spring 303 counter-clockwise, as viewed in FIG. 41, to move plate 304 downwardly away from the forwarding ratchet pawl 306 and swing the reversing ratchet pawl 305 downwardly to an inoperative position. The pawl 306 then is urged by spring 309 in a counter-clockwise direction to its operative position in which it bears again tab 310a of stop plate 310. The pawls 305 and 306 are mounted pivotally on the studs 290 on the plate 201 and the stop plate 310 is mounted by the studs 290 in a fixed position relative to the actuator plate 201. The tab 310a prevents the pawl 306 from swinging inwardly beyond its operative position relative to the ratchet wheel 307. Then, on each stroke of the drive plate 176 (FIG. 22) and after the T-shaped end 85e has pushed the slide holder 71 aligned therewith back into the tray 74, the continued travel of the plate 176 pushes the plate 201 through its indexing stroke to the left, as viewed in FIG. 41, and the ratchet pawl engages the ratchet gear 307 and turns the gear one indexing angle in a counter-clockwise direction. This indexes the tray 74 forwardly to move the next slide holder 71 into interlocked and aligned position relative to the actuator 85. Then, on the return stroke of the drive plate 176, the plate 201a returns to its normal position, the pawl 306 merely swinging out from the ratchet gear 307 without turning the gear 307. It should be noted that in the indexing stroke of the plate 201 and ratchet pawl 306, the locking notch 201c (FIG. 33) moves out of locking engagement with the gear 82 before the ratchet pawl 306 (FIG. 41) starts to turn the ratchet gear 307.

When the lever 275 is moved manually to its reverse setting (counter-clockwise as viewed in FIG. 42), it swings the cam plate 277 to the left to cam the pin 302 from the cam face 277d onto cam face 277g and also to again cam the pin 280 out of the notch 277c. This swings the lever 281 counter-clockwise to again set the clutch mechanism 145 (FIG. 36) so that the dog 148c is held out of operative relation to the lever 162 and only the lever 146 may be used to start and stop clutching action. Movement of the pin 302 onto the cam face 277g swings the arms 301 clockwise as viewed in FIG. 41 to move the ratchet pawl 306 to an inoperative position and permit the reversing ratchet pawl 305 to be moved inwardly by spring 309 to its operative position, the tab 310a limiting inward movement of the pawl 305. Then, on each actuating movement of the plate 201, the pawl 305 engages the ratchet gear 307 and turns the gear 307 clockwise to index the tray 74 (FIG. 30) backwardly along the guideway 81 to bring the next succeeding, forwardly positioned, slide holder 71 into alignment and interlocking engagement with the actuator 85.

When the slide projector is to be operated by remote control by the pointer projector 219, the lever 275 is first set manually in its forward position. Then, on each momentary manual actuation of the switch 218, the solenoid winding 160 (FIG. 35) is energized momentarily to momentarily swing the lever 146 (FIG. 36) out of the path of the lever 162 to start a single revolution of the clutch disc 163. For reverse indexing operation by remote control, the index control lever 275 (FIG. 2) is left in its forward setting and a switch 321 of the pointer projector is moved from a forward setting thereof to a reverse setting thereof. This setting of the switch 321 causes a solenoid winding 322 (FIG. 5) to be energized to pull a pull rod 323 connected to the lever 301 (FIG. 41) to move the lever from its forward setting to its reversing setting holding the ratchet pawl 306 inoperative and permitting the reversing ratchet arm 305 to move to its operative position. Then, on each actuation of the indexing switch 218 (FIG. 2), the slide holder 71 at the projection station is moved back into the tray 74, the tray is indexed in the reverse direction, and the next slide holder is moved to the projecting station.

In order to lose no time when there is no slide holder 71 in the particular guideway of the tray 74 (FIG. 30) aligned with the actuator 85 when the tray is indexed to that position, upon the pulling stroke of the actuator 85, the shutter 191 (FIG. 21) is not pushed back out of the aperture 86 since a slide holder is required to effect this. Normally, when there is a slide holder being pulled to the projection station 86, the shutter is slid back along the guideway formed by the channel-shaped drive plate 176 and the wall 153 and a camming spring finger 191b moves over a limit switch 331 (FIG. 40) to open the switch 331. The switch 331 is in parallel with the momentary switch 218 (FIG. 2) to the solenoid winding 160 (FIG. 35) and opening of the switch 331 de-energizes the solenoid winding 160 just before the driven clutch disc 163 completes its single revolution so that the lever 146 is swung to its declutching position to stop the drive of the disc 163 with a slide holder at the projection station, the finger 191b (FIG. 40) maintaining the switch 331 open until the shutter is started back by deliberate manual or automatic operation of the clutch mechanism 145. However, when there is no slide holder pulled to the projection station and the shutter 191 is not moved back to open the switch 331, the switch 331 maintains the solenoid winding 160 (FIG. 35) energized to hold the lever 146 (FIG. 36) inoperative to declutch and a new slide changing and tray indexing cycle begins at once. This uninterrupted operation of the slide changing mechanism continues until the tray 74 brings a slide holder to the actuator 85 and the slide holder is pulled to the projection station and pushes the shutter 191 (FIG. 40) back to open the switch 331 to cause declutching. The switch 331 is mounted on the back of wall 153, and has an actuating member 331a of electrical insulating material projecting through a hole 153a in the wall.

As illustrated in FIGS. 3, 4 and 5, the optical objective 192 is mounted by a holder 341 fitted into a socket 342a of a slide 342. A knob 343 may be turned manually to turn a screw 344 held rotatably and against longitudinal movement by the panel 56 and a lamp housing 345 fixed to the plate 271. The screw moves an L-shaped slide 346 along the plate 371 and moves the slide 342 along the plate, the slide 342 having a plate-like slide portion 342b resting slidably on the plate. Guide slots 271a and 271b permit movement of the slide 346 and screws 347 connecting the slide 346 to the slide portion 342b. A tension spring 351 urges the slide 342 to the left, as viewed in FIG. 4, to maintain the screw 344 against the panel 56.

In FIG. 30, there is shown a runout detector switch 348 having an actuating button 349. When the tray 74 is in a position presenting any of the slide holders 71 in alignment with the slide changer actuator 85, the tray engages the button 349 and holds the switch 348 closed. The switch 348 is in series with the switches 218 (FIG. 2) and 331 (FIG. 25) to the solenoid winding 160 (FIG. 34) and when closed permits energization of the winding 160 when open. When the slide-holder 71 in the last guideway in the tray 74 has been moved by the slide changer actuator 85 back into the tray and the tray is indexed, the tray moves out of engagement with the switch button 349 and the switch 348 opens to prevent further energization of the solenoid winding. Hence, the tray must be in a position with one of its slide holder guideways in alignment with the actuator 85 or the solenoid winding cannot be energized to actuate the slide changing and tray indexing drive.

While the invention is thus described, it is not wished to be limited to the precise details described, as changes may be readily made without departing from the spirit of the invention.

What is claimed is:

1. In a slide projector, a projection station, a slide tray having side-by-side guideways therein, a plurality of slide members in the guideways, a second guideway guiding the tray, means for indexing the tray along the second guideway, slide changer means operable in a cycle to move a slide member at the projection station into the tray and then actuate the indexing means to move the tray to align the next guideway in tray with the slide changing means and then move back to move any slide member in the last-mentioned guideway to the projection station, a shutter movable by the slide changer to the projection station and movable out of the projection station only by a slide member being moved into the projection station, single revolution clutch means for driving the slide changer through said cycle, cyclical means for actuating the clutch means, manual means for actuating the cyclical means, and means operable by only by movement of the shutter by a slide member away from the projection station to render the cyclical means inoperable so that if no slide member is moved to the projection station the clutch means is actuated to drive the slide changer to again index the tray.

2. In a slide projector, a tray having a series of slide guideways therein, slide members in the guideways, a projection station, tray indexing means, slide changer means operable in a cycle to move one of the slide members from the projection station into one of the guideways and then actuate the tray indexing means to move the next guideway into alignment with the slide changer means and move any slide member in said next guideway to the projection station, a shutter, ratchet type drive means for moving the shutter to the projection station as the slide changer means moves in the portion of its cycle to move any slide member at the projection station into the tray, the shutter being movable only by one of the slide members out of the projection station to a retracted position, means for driving the slide changer means continuously, shutter actuated means operable by movement of the shutter to its retracted position to stop the driving means as one of the slide members is moved to the projection station, and selectively operable means for overriding the shutter actuated means to start a cycle of the slide changer means.

3. In a slide changer, the combination of a guideway, a drive member reciprocable in the guideway, a crank arm rotated in a predetermined direction about an axis normal to the guideway, a connecting rod connected rotatably to the end of the crank arm at the central portion of the rod and rotatably to the drive member at one end of the rod, the other end of the connecting rod having a cam lobe thereon, and a pair of posts positioned on opposite sides of said axis and in the path of the cam lobe to force the connecting rod overcenter relative to the crank arm to change the action of the connecting rod from pulling the drive member to pushing the drive member.

4. In the slide changer defined by claim 3, the cam lobe and the posts being so constructed and arranged that the cam lobe engages each post throughout a substantial angle of rotation of the connecting rod on each side of the overcenter position thereof.

5. In the slide changer defined by claim 3, a drive shaft, a detent disc keyed to the shaft and having a slot therein, and a ball detent carried by the crank arm and urged into the slot in the detent disc to form a driving connection between the shaft to the crank arm.

6. In a slide projector, a guideway, a slide changing member reciprocable along the guideway, a drive shaft, a crank arm of a predetermined length on the drive shaft and rotatable thereby, a link connected to the crank at a point intermediate the ends thereof and having a linking arm extending from said point to one end of the arm and of the same length as the crank arm, means connecting the free end of the linking arm to the slide changing member, the link also having a camming arm extending from said point to the other end of the arm, and stop means positioned in the path of the camming arm as the crank arm reaches extreme positions laterally of the guideway for moving the link overcenter from a pulling position relative to the slide changing member to a pushing position relative thereto.

References Cited in the file of this patent

UNITED STATES PATENTS

| | | |
|---|---|---|
| 2,076,924 | Spindler | Apr. 13, 1937 |
| 2,116,704 | Laube et al. | May 10, 1938 |
| 2,401,506 | Pechkranz | June 4, 1946 |
| 2,594,162 | Hartley | Apr. 22, 1952 |
| 2,784,817 | Lessman | Mar. 12, 1957 |
| 2,805,503 | McKee et al. | Sept. 10, 1957 |
| 2,837,851 | Wiklund | June 10, 1958 |
| 2,874,497 | Huff et al. | Feb. 24, 1959 |
| 2,907,128 | Norton | Oct. 6, 1959 |
| 2,949,814 | Boughton et al. | Apr. 23, 1960 |